US010217036B2

(12) United States Patent
Hitosugi

(10) Patent No.: US 10,217,036 B2
(45) Date of Patent: Feb. 26, 2019

(54) PRINTING APPARATUS, PRINTING METHOD, AND MEDIUM

(71) Applicant: CANON KABUSHIKI KAISHA, Tokyo (JP)

(72) Inventor: Takayuki Hitosugi, Mitaka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/466,654

(22) Filed: Mar. 22, 2017

(65) Prior Publication Data
US 2017/0193342 A1 Jul. 6, 2017

Related U.S. Application Data

(62) Division of application No. 14/676,472, filed on Apr. 1, 2015, now Pat. No. 9,646,232.

(30) Foreign Application Priority Data

Apr. 8, 2014 (JP) ................................. 2014-079721

(51) Int. Cl.
G06F 3/12 (2006.01)
G06K 15/02 (2006.01)

(52) U.S. Cl.
CPC ..... *G06K 15/1852* (2013.01); *G06K 15/1807* (2013.01); *G06K 15/189* (2013.01); *G06K 15/1813* (2013.01); *G06K 15/1836* (2013.01); *G06K 15/1847* (2013.01); *G06K 15/1849* (2013.01); *G06K 15/1851* (2013.01); *G06K 15/1861* (2013.01); *G06K 15/1863* (2013.01); *G06K 2215/0077* (2013.01); *G06K 2215/0094* (2013.01)

(58) Field of Classification Search
CPC .......... G06K 15/1852; G06K 15/1807; G06K 15/1813; G06K 15/1836; G06K 15/1849; G06K 15/1847; G06K 15/1863; G06K 15/189; G06K 2215/0077; G06K 2215/0094
USPC ........................................................ 358/1.15
See application file for complete search history.

(56) References Cited

U.S. PATENT DOCUMENTS

| 6,466,210 | B1 * | 10/2002 | Carlsen ................... G06T 11/60 345/629 |
| 8,472,042 | B2 | 6/2013 | Tokumoto |
| 2005/0275856 | A1 * | 12/2005 | Oki ......................... G06K 15/02 358/1.9 |
| 2008/0144952 | A1 | 6/2008 | Chen |

(Continued)

FOREIGN PATENT DOCUMENTS

JP 2011-061555 3/2011

OTHER PUBLICATIONS

T. Porter, et al., "Compositing Digital Images", Computer Graphics, vol. 18, No. 3, ACM 1984. (Previously Cited During Prosecution of Parent U.S. Appl. No. 14/676,472.).

(Continued)

Primary Examiner — Neil R McLean
(74) Attorney, Agent, or Firm — Venable LLP

(57) ABSTRACT

An object of the present invention is to provide an image processing apparatus capable of combining a group element so that a color intended by a user is output ultimately even in the case where flattening is performed on the way of the processing performed on the group.

14 Claims, 22 Drawing Sheets

(56) References Cited

U.S. PATENT DOCUMENTS

| | | | |
|---|---|---|---|
| 2011/0058191 A1 | 3/2011 | Tokumoto | |
| 2011/0216086 A1* | 9/2011 | Hitosugi | G09G 5/00 345/629 |
| 2012/0288211 A1* | 11/2012 | Hitosugi | G06T 9/00 382/244 |

OTHER PUBLICATIONS

Adobe Systems: "Document management-Portable document format-Part 1: PDF 1.7", ISO 32000-1, 2008. (Previously Cited During Prosecution of Parent U.S. Appl. No. 14/676,472.).

* cited by examiner

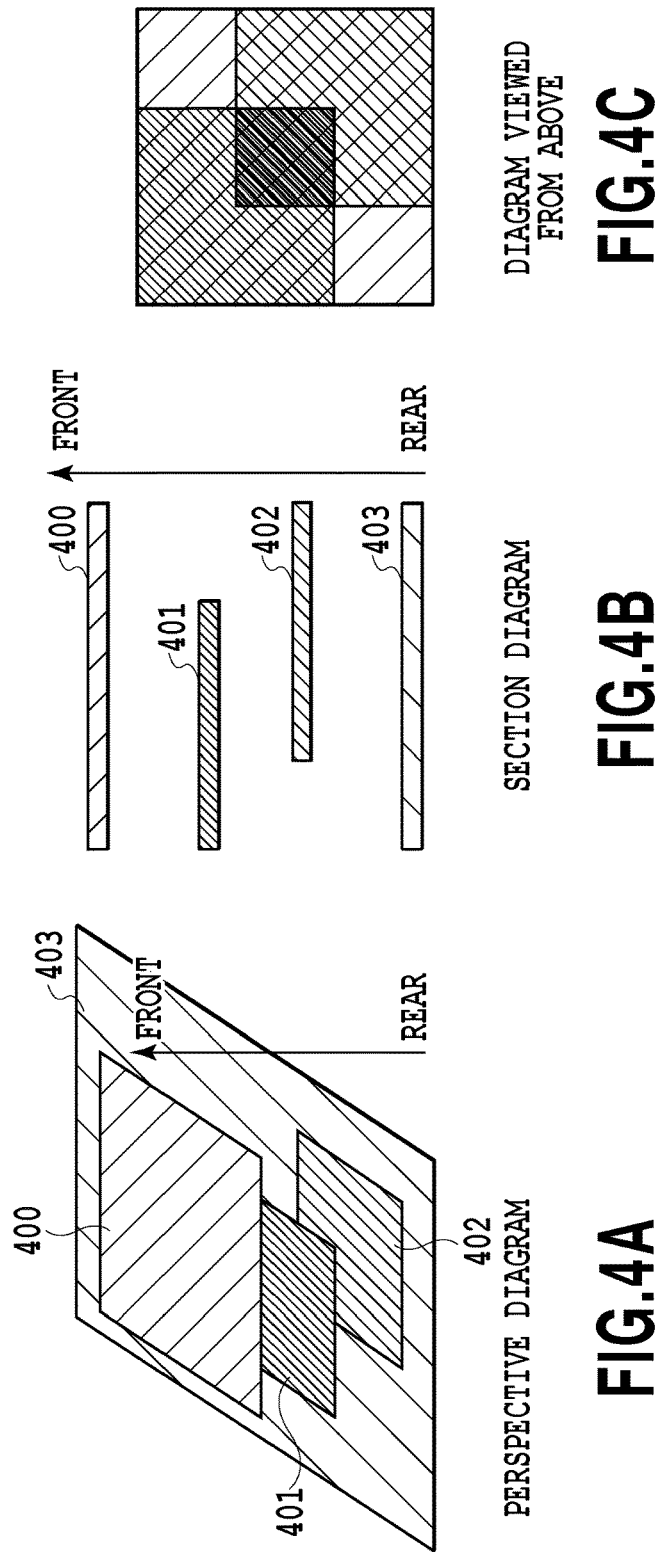

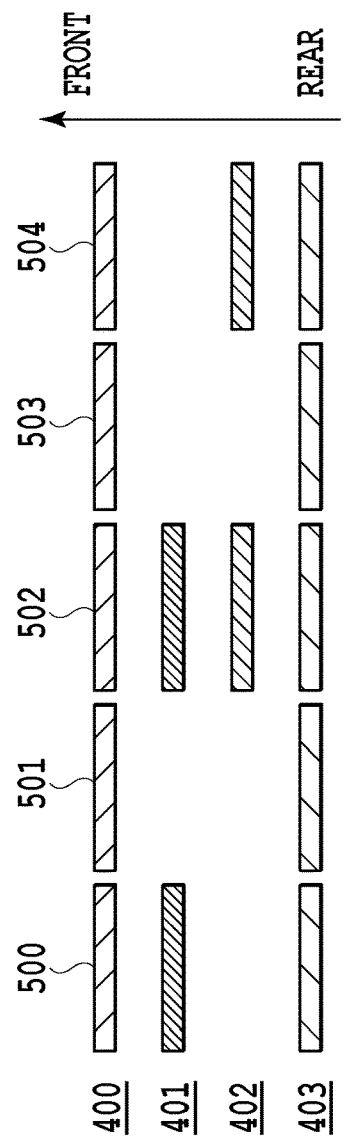
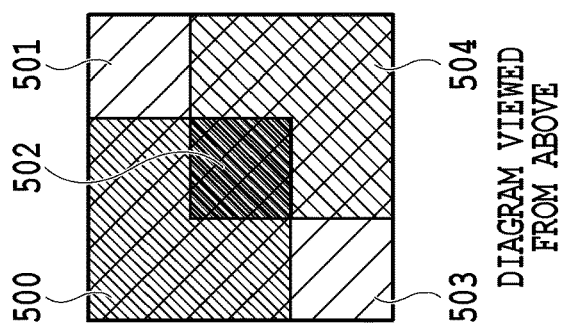
FIG.5B
FIG.5A

PRINTING APPARATUS, PRINTING METHOD, AND MEDIUM

This application is a divisional of application Ser. No. 14/676,472, filed Apr. 1, 2015, which claims priority to Japanese Application No. JP 2014-079721, filed Apr. 8, 2014, the contents of each of which are incorporated by reference herein.

BACKGROUND OF THE INVENTION

Field of the Invention

The present invention relates to an image processing apparatus, an image processing method, and a medium for generating a raster image. In particular, the present invention relates to image processing accompanied by combining and is suitable to rendering of a raster image.

Description of the Related Art

Combining processing in rendering is processing to form an image as the results of combining a front image and a rear image. As one example, according to the Porter-Duff rules described in "Compositing Digital Images" (T. Porter and T. Duff, Computer Graphics, vol. 18, No. 3, ACM 1984.), 12 compositing operators (combining operators) are systematized to be capable of show-through compositing (combining). As another example, in "Document management—Portable document format—Part 1: PDF 1.7" (Adobe Systems, ISO 32000-1, 2008.), a method of simultaneously performing show-through combining of a set of continuous objects called Transparency Groups of PDF (Portable Document Format) is specified. The set of continuous objects (in the present specification, described as a "group") may have another group as an element. That a group has another group as an element means that the group has a nest structure. In the present specification, an element of a group is described as a "group element"

As a technique related to rendering, there is known a technique to make an attempt to reduce data size, in the case where intermediate data has overflowed a memory area for storing the intermediate data, by temporarily performing rendering of the intermediate data at the point of time of the overflow (see Japanese Patent Laid-Open No. 2011-61555). Making an attempt to reduce data size by, in particular, combining processing in this technique is described as "flattening" in the present specification.

SUMMARY OF THE INVENTION

As described above, there is known a technique to make an attempt to reduce data size, in the case where intermediate data has overflowed a memory area for storing the intermediate data, by temporarily performing rendering of the intermediate data at the point of time of the overflow. However, there is a case where combining processing is performed stepwise even in the combining processing of groups that should be originally combined at the same time at the time of flattening an image having a group, and therefore, there is a case where a color different from the color intended by a user is output.

An object of the present invention is to provide an apparatus that solves the above-described problem.

The present invention is a printing apparatus comprising: a reception unit configured to receive print data including a plurality of objects forming a group; a generation unit configured to generate intermediate data of each of the plurality of objects from the received print data; a determination unit configured to determine whether or not a total size of the intermediate data generated by the generation unit from the print data exceeds a threshold value; and a combining unit configured to combine the generated intermediate data based on that the total size is determined to exceed the threshold value, wherein the combining unit, in a case where the determination unit determines that the total size exceeds the threshold value as the result of that the intermediate data of part of the plurality of objects is generated by the generation unit, combines the generated intermediate data of the part of the objects without combining with the intermediate data of a background of the part of the objects.

According to the present invention, even in the case where flattening is performed on the way of the processing performed on a group, it is possible to combine group elements so that a color intended by a user is output ultimately.

Further features of the present invention will become apparent from the following description of exemplary embodiments (with reference to the attached drawings).

BRIEF DESCRIPTION OF THE DRAWINGS

FIGS. 4A to 4C are diagrams showing an example of input data 203 in the first embodiment;

FIGS. 5A and 5B are diagrams showing a state where an area is divided for each range in which an object and BackGround overlap each other in the first embodiment;

DESCRIPTION OF THE EMBODIMENTS

In the following, preferred embodiments of the present invention are explained in detail based on the attached drawings.

First Embodiment (Configuration of Image Processing Apparatus 100)

Figure 1:
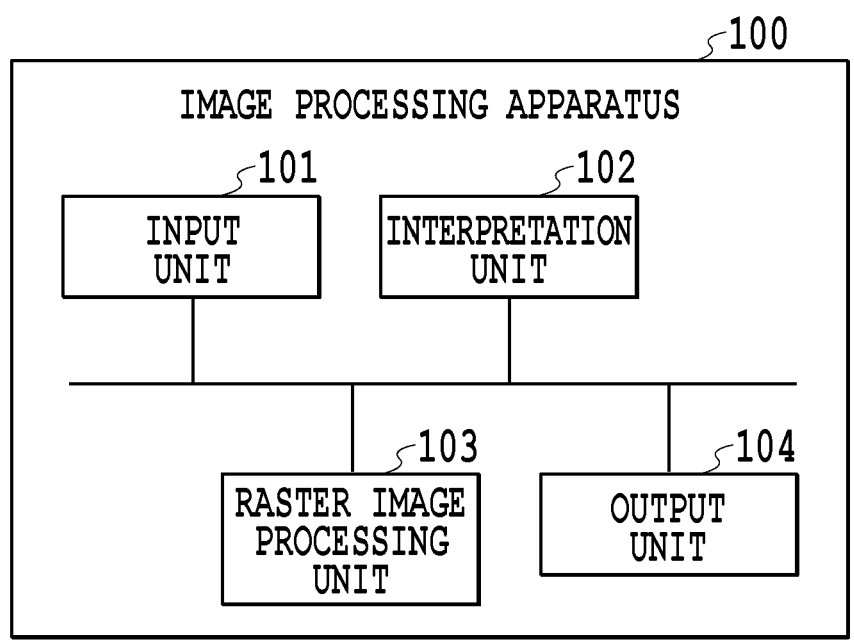
FIG. 1 is a block diagram showing a configuration of an image processing apparatus 100 in a first embodiment.

FIG. 1 is a block diagram showing a configuration of an image processing apparatus 100 in a first embodiment. The image processing apparatus includes an input unit 101, an interpretation unit 102, a raster image processing unit 103, and an output unit 104. The input unit 101 receives input data from an external apparatus connected to the image processing apparatus 100. The interpretation unit 102 interprets the input data received by the input unit 101, extracts drawing commands, and sorts the drawing commands in order of drawing from the rear to the front. The input data in the first embodiment is PDL data described in the PDL (Page Description Language). A preferred format of input data is the PDF described in "Document management—Portable document format—Part 1: PDF 1.7" (Adobe Systems, ISO 32000-1, 2008.), and a preferred drawing command is an object of the PDF. The raster image processing unit 103 generates a raster image based on the drawing commands extracted by the interpretation unit 102. The output unit 104 generates output data by performing image processing such as halftone processing on the raster image generated by the raster image processing unit 103 and outputs the generated output data.

The image processing apparatus 100 in the first embodiment is an MFP (Multi Function Peripheral) and the output unit 104 outputs output data in order to perform printing on a printing sheet. The input unit 101, the interpretation unit 102, the raster image processing unit 103, and the output unit 104 are implemented by a CPU loading various programs onto a RAM (Random Access Memory) and executing the loaded programs. Further, the raster image processing unit 103 may be implemented by an ASIC (Application Specific Integrated Circuit) in order to generate a raster image, not by the CPU.

(Data Flow in the Image Processing Apparatus 100)

Figure 2:
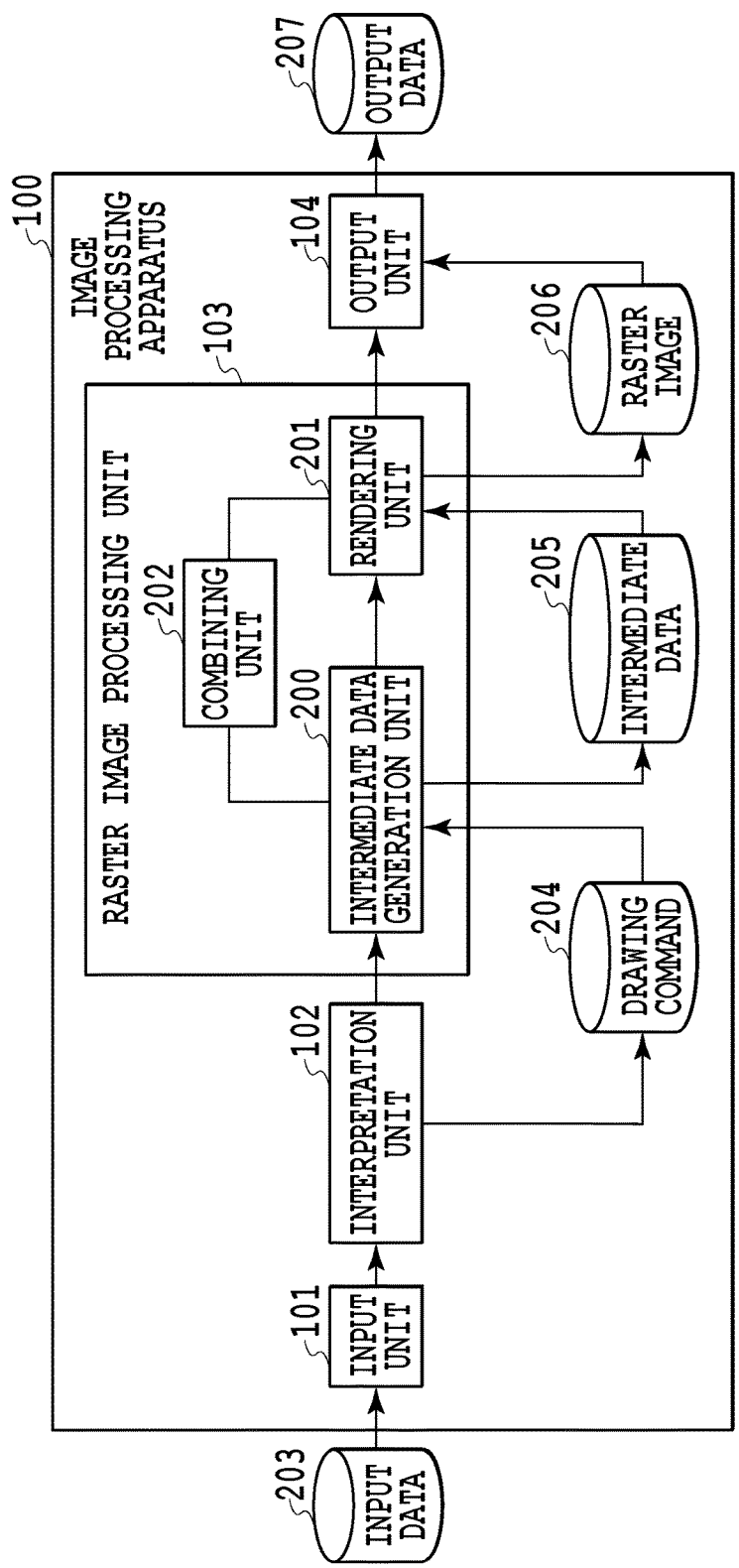
FIG. 2 is a diagram showing a data flow in the image processing apparatus 100 in the first embodiment.

FIG. 2 is a diagram showing a data flow in the image processing apparatus 100. The raster image processing unit 103 includes an intermediate data generation unit 200, a rendering unit 201, and a combining unit 202. The intermediate data generation unit 200 generates intermediate data 205 from a drawing command 204. The rendering unit 201 generates a raster image 206 by performing rendering of the intermediate data 205. The intermediate data generation unit 200 and the rendering unit 201 perform combining processing of intermediate data by using the combining unit 202 in the processing of each unit.

(Processing in the Intermediate Data Generation Unit 200)

Figure 3:
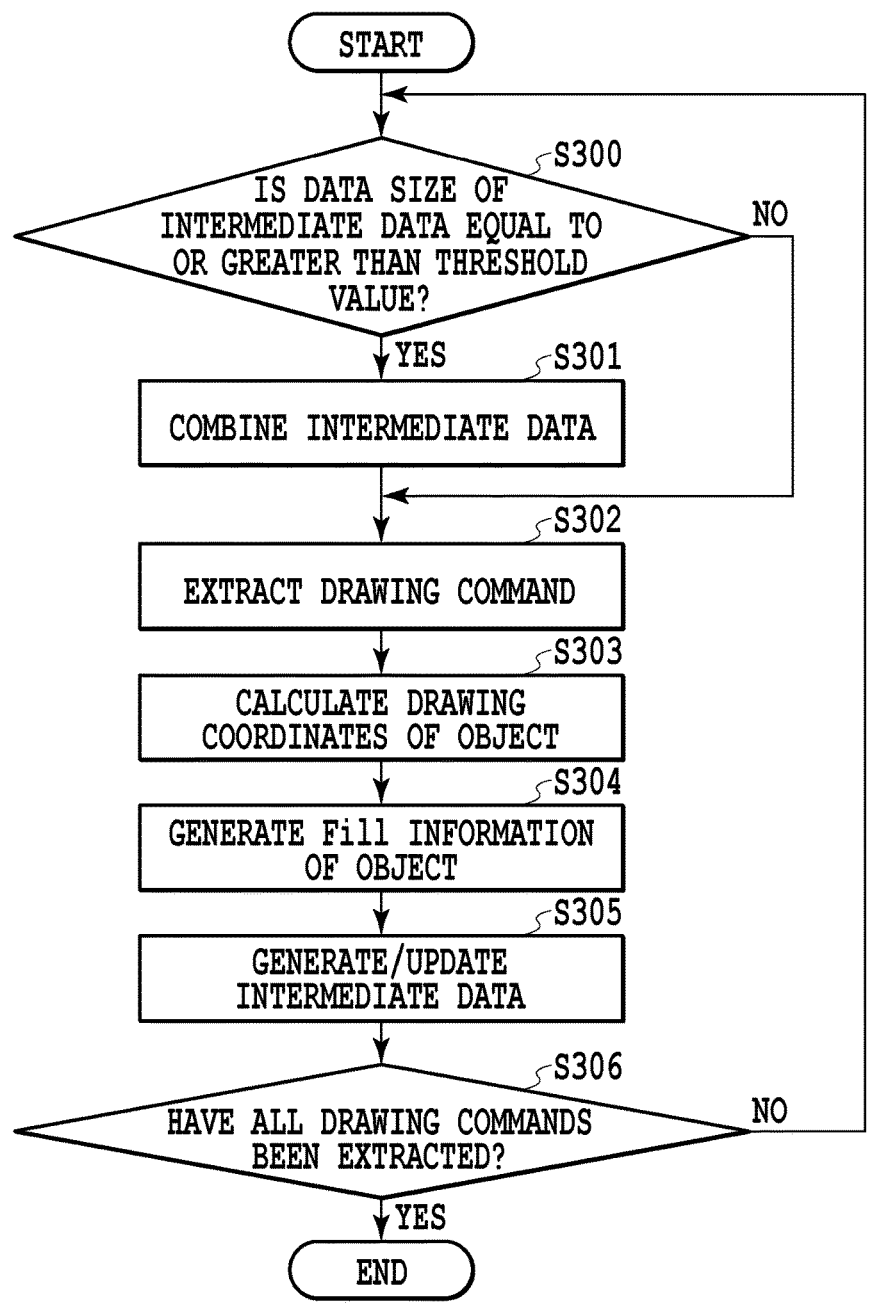
FIG. 3 is a flowchart of processing that is performed by an intermediate data generation unit 200 in the first embodiment.

FIG. 3 is a flowchart of processing that is performed by the intermediate data generation unit 200. At step S300 (hereinafter, "step S300" is abbreviated to "S300" and this also applies to other steps), the intermediate data generation unit 200 determines whether or not the data size of the intermediate data 205 is equal to or greater than a threshold value determined in advance. In the case of determining that the data size of the intermediate data 205 is equal to or greater than the threshold value, at S301, the intermediate data generation unit 200 combines the intermediate data 205 by using the combining unit 202 and turns a flattened raster image into a new drawing command. In the case of determining that the data size of the intermediate data 205 is less than the threshold value, or in the case of combining the intermediate data 205 at S301, next, the intermediate data generation unit 200 extracts one of the drawing commands 204 at S302. Next, the intermediate data generation unit 200 calculates drawing coordinates of an object from the extracted drawing command at S303 and generates Fill information of the object at S304. In the calculation of the drawing coordinates of the object, the intermediate data generation unit 200 performs conversion from a page coordinate system into an output coordinate system. Further, in the case where the object has a vector format, the intermediate data generation unit 200 finds the coordinates of the contour of the object in the output coordinate system. Next, at S305, the intermediate data generation unit 200 updates the intermediate data based on the information on the coordinates of the object and the Fill information. Here, in the case where the intermediate data has not been generated yet, the intermediate data generation unit 200 newly generates intermediate data. Next, at S306, the intermediate data generation unit 200 determines whether or not all the drawing commands 204 have been extracted. In the case of determining that all the drawing commands 204 have not been extracted yet, the processing returns to S300. In the case of determining that all the drawing commands 204 have been extracted, the intermediate data generation unit 200 exits the processing.

(Intermediate Data)

Hereinafter, details of the intermediate data 205 are explained.

FIGS. 4A to 4C are diagrams showing an example of input data 203: FIG. 4A is a perspective diagram representing a three-dimensional relationship, FIG. 4B is a section diagram, and FIG. 4C is a top diagram. In this example, objects 400 to 402 and a BackGround 403 overlap with each other. In the intermediate data 205, the area is divided into areas for each range in which the objects and the BackGround overlap with each other.

FIG. 5A and FIG. 5B are diagrams showing a state where the area is divided into areas in the intermediate data 205. By referring to FIG. 5A showing a top view, it is known that the area is divided into five areas 500 to 504. For example, the area 500 is an area formed by the object 400, the object 401, and the BackGround 403 overlapping with each other. FIG. 5B shows which objects and BackGround overlap to form each of the areas 500 to 504.

Hereinafter, the data structure of the intermediate data 205 is explained.

Figure 6:
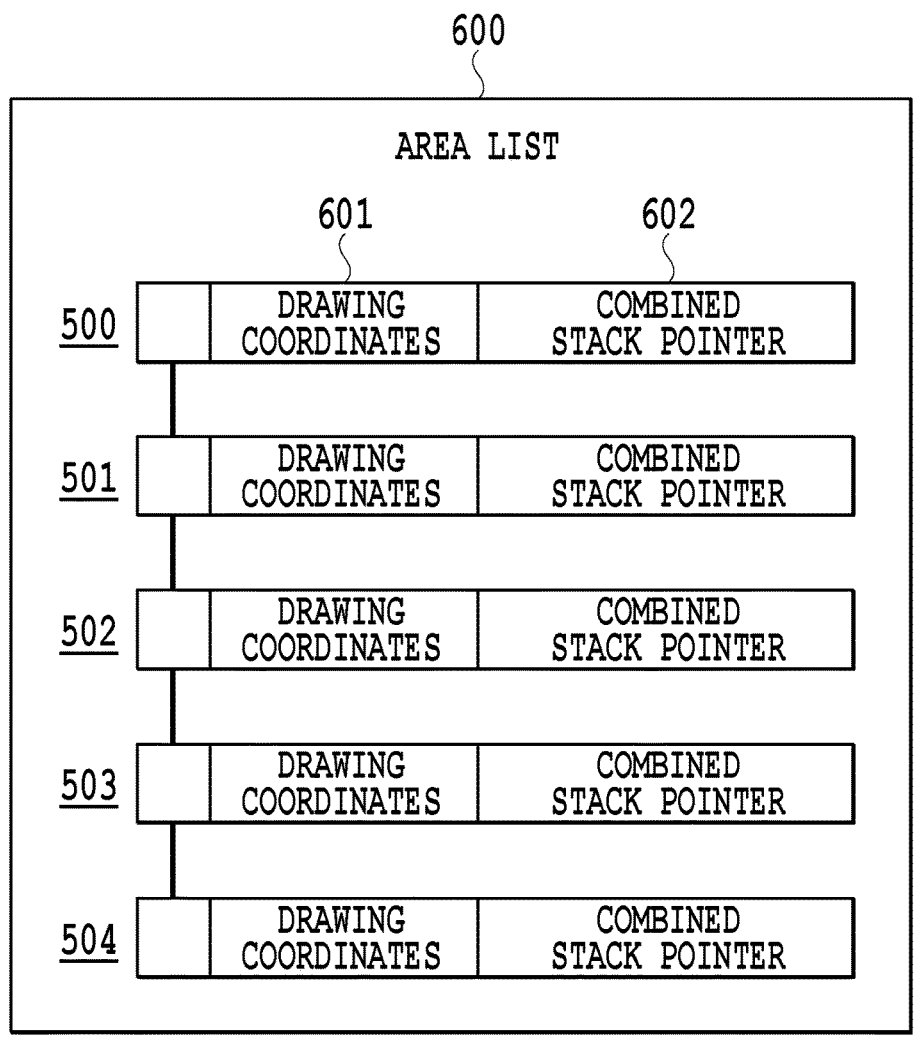
FIG. 6 is a diagram showing a data structure of an area list 600 in the first embodiment.

FIG. 6 is a diagram showing a data structure of an area list 600. The area list 600 is data for managing information about the divided areas and the information corresponding to each area is linked by a list structure. In a preferred embodiment, the one area list 600 exists for one page of the input data 203. In the area list 600 in FIG. 6, the information corresponding to the areas 500 to 504 is linked by a list structure. The information includes drawing coordinates 601 and a combined stack pointer 602. The drawing coordinates 601 are represented by XY coordinates in the output coordinate system (the top-left point is taken to be the origin) and in a preferred embodiment, the drawing coordinates 601 are represented by the maximum value and the minimum value of the Y coordinate and the maximum value and the minimum value of the X coordinate at each Y coordinate in the area. The combined stack pointer 602 is data that is used to refer to a combined stack. In a preferred embodiment, the information included in the area list 600 is sorted in the ascending order of the minimum value of the Y coordinate of the drawing coordinates 601.

Figure 7:
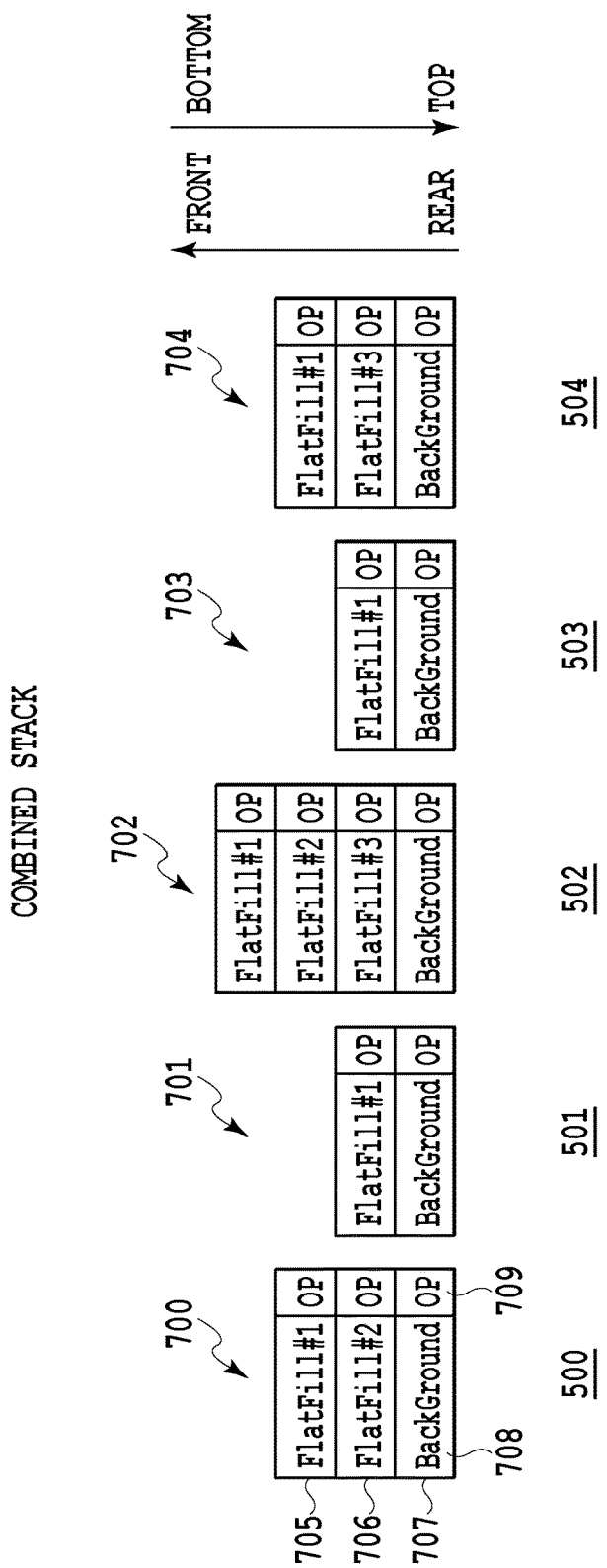
FIG. 7 is a diagram showing a data structure of a combined stack in the first embodiment.

FIG. 7 is a diagram showing a data structure of a combined stack. The combined stack is data for managing information about overlap and one combined stack exists for one area after division. For example, a combined stack 700 is a combined stack corresponding to the area 500 and is referred to by the combined stack pointer 602 corresponding to the area 500.

Further, the combined stack has a stack structure having a combined node as a stack element. Each combined node is data having information corresponding to the overlapping object or BackGround. For example, the combined stack 700 has three combined nodes 705 to 707. The combined stack 705 corresponds to the object 400, the combined node 706 to the object 401, and the combined node 707 to the BackGround 403, respectively. The combined nodes are stacked in the order of the overlapping objects and BackGround and the rear side is the top of the stack (in other words, the combined node closest to the rear side is stacked last). For each combined stack, one or more combined nodes exist without exception.

Figure 8:
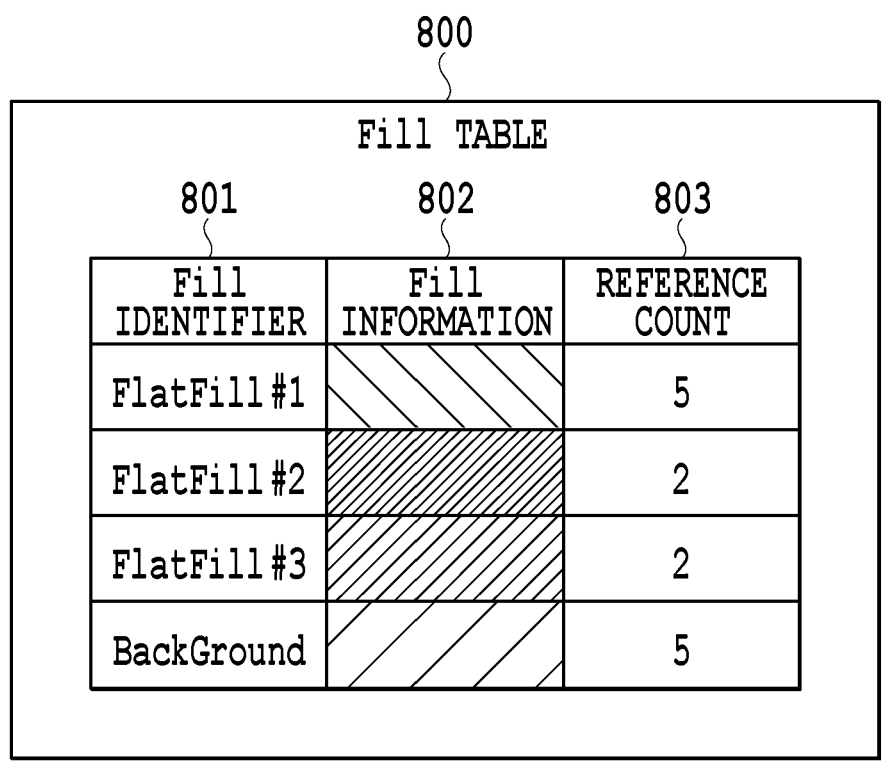
FIG. 8 is a diagram showing a structure of a Fill table 800 in the first embodiment.

The combined node consists of a Fill identifier 708 and a combining operator 709. The Fill identifier 708 is associated with a Fill identifier 801 within a Fill table 800. FIG. 8 is a diagram showing a structure of the Fill table 800. The Fill table 800 includes three column items: the Fill identifier 801, Fill information 802, and a reference count 803. The Fill information 802 is data of the color of objects and BackGround, for example, RGB values of a single color, gradation, image data, etc. The reference count 803 is the count value indicating the number of combined nodes that refer to the corresponding Fill information.

Figures 9A, 9B:
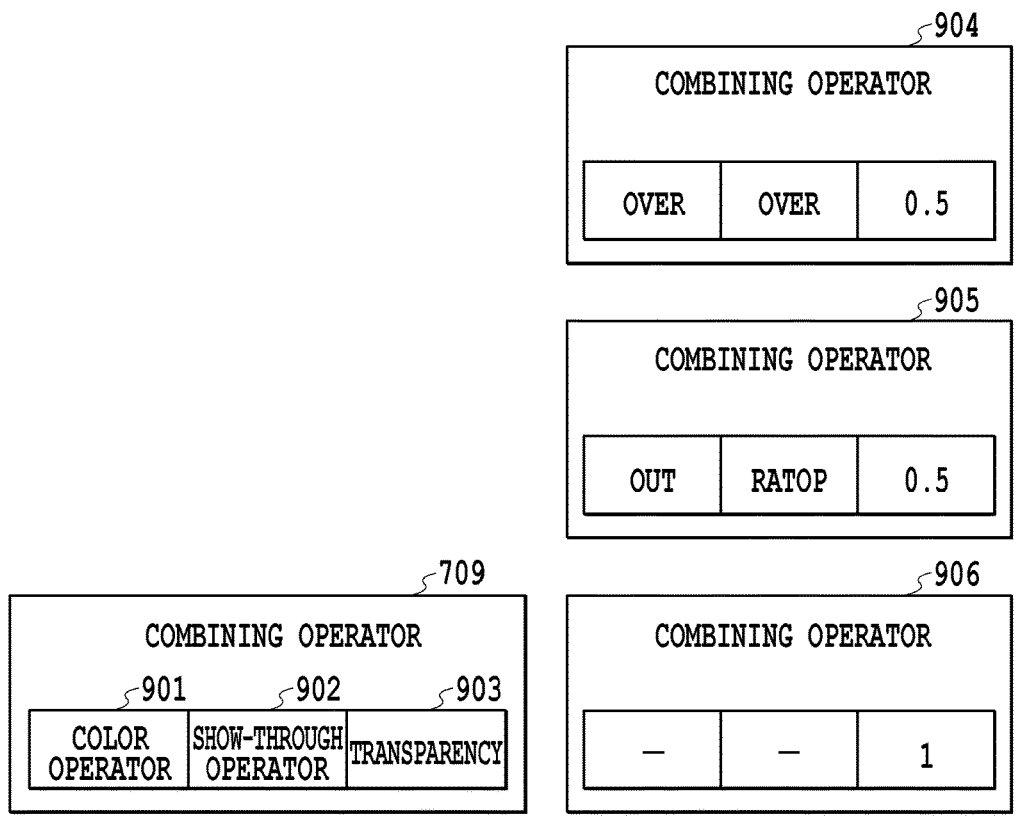
FIGS. 9A and 9B are diagrams showing a structure of a combining operator 709 in the first embodiment.

The combining operator 709 is an operator that specifies how combining is performed in each overlap. In FIG. 7, the combining operator 709 is denoted by "OP" and the specific internal structure of the combining operator 709 is shown in FIG. 9A and FIG. 9B. As shown in FIG. 9A, the combining operator 709 includes a color operator 901, a show-through operator 902, and transparency 903. The color operator 901 specifies how to calculate the color of the combining results. The show-through operator 902 specifies how to calculate the transparency of the combining results. The transparency 903 indicates a degree of show-through of an object or BackGround. In a preferred embodiment, the color operator 901 and the show-through operator 902 are specified by Compositing Operators of "Compositing Digital Images" (T. Porter and T. Duff, Computer Graphics, Vol. 18, No. 3, ACM 1984.) or by the blend mode of PDF of "Document management—Portable document format—Part 1: PDF 1.7" (Adobe Systems, ISO 32000-1, 2008.). The transparency 903 takes a value in the range between 0 and 1 and 0 means the perfect transparency and 1 means opaqueness (no show-through). In FIG. 9B, examples of the combining operator 709 of the combined nodes 705 to 707 are shown as combining operators 904 to 906, respectively. As in the combining operator 906, for the combined node closest to the rear, it is not necessary to specify the color operator 901 and the show-through operator 902.

(Raster Image Generation Processing)

Hereinafter, the processing of the rendering unit 201 to perform rendering of the intermediate data 205 to generate the raster image 206 is explained.

Figure 10:
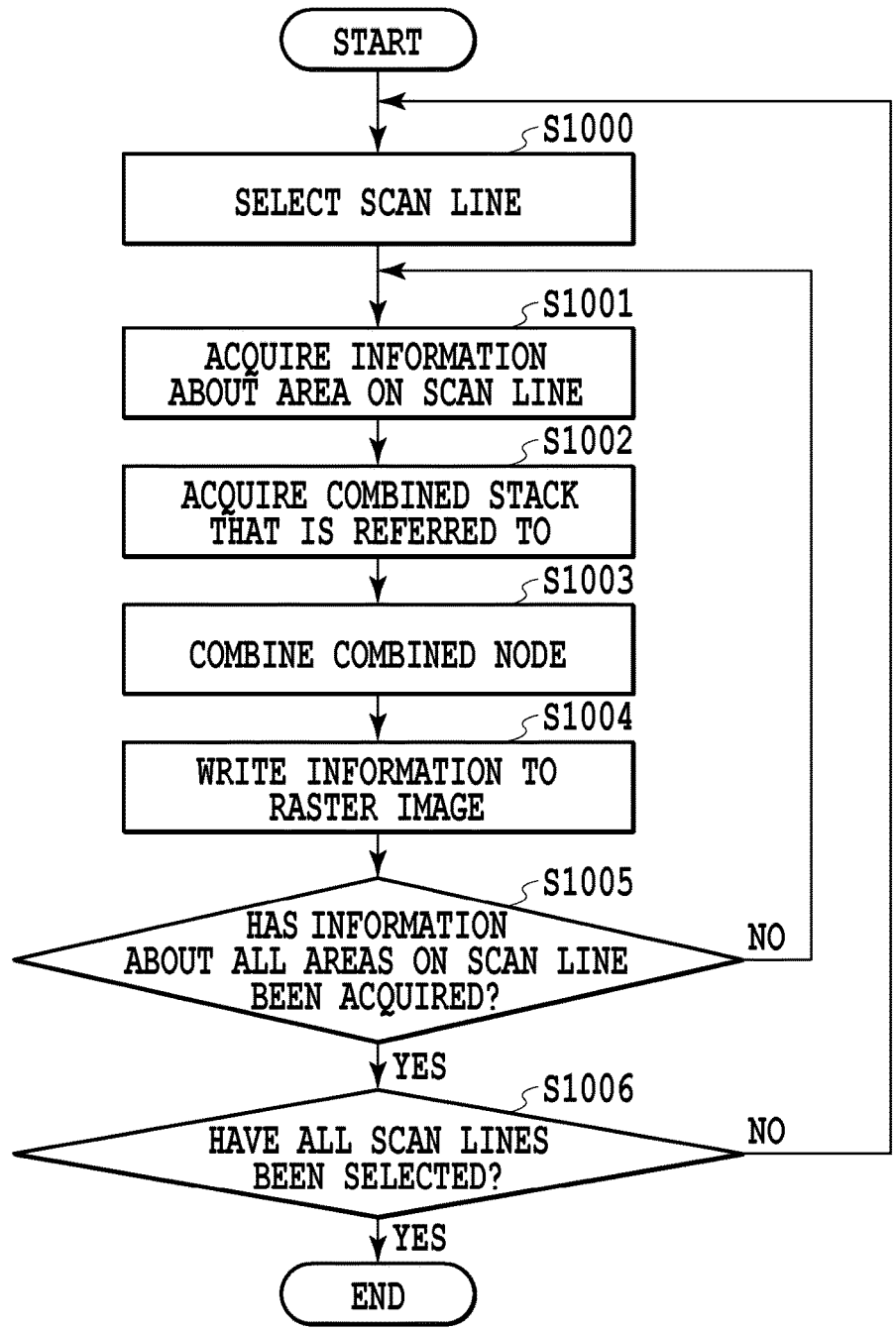
FIG. 10 is a flowchart of raster image generation processing that is performed by a rendering unit 201 in the first embodiment.

FIG. 10 is a flowchart of raster image generation processing that is performed by the rendering unit 201. First, at S1000, the rendering unit 201 selects one scan line. In a preferred embodiment, the scan lines are selected in order from the scan line that passes through the page origin in the main scan direction. Next, the processing proceeds to S1001. At S1001, the rendering unit 201 acquires information on the area located on the scan line from the area list 600. Next, the processing proceeds to S1002. At S1002, the rendering unit 201 acquires the combined stack that the combined stack pointer 602 included in the acquired information refers to. Next, the processing proceeds to S1003. At S1003, the rendering unit 201 combines the combined node included in the acquired combined stack by using the combining unit 202. After the combining at S1003 is completed, only one combined node remains in the combined stack. Next, the processing proceeds to S1004. At S1004, the rendering unit 201 generates a raster image by writing information to the memory address of the output destination in accordance with the Fill information 802 corresponding to the one remaining combined node. Here, it is possible to acquire the Fill information 802 corresponding to the combined node from the Fill table 800 by searching for the item that agrees with the Fill identifier 708 from the items of the Fill identifier 801. At the time of writing information in accordance with the Fill information 802 corresponding to the combined node, in the case where the Fill information 802 is, for example, a color value of a single color, the color value is written as it is. Further, in the case where the Fill information 802 is image data, processing to increase or decrease the resolution into the output resolution for the image data is performed and clipping processing is performed after the processing to increase or decrease the resolution, then, the image data is written. Next, the processing proceeds to S1005. At S1005, the rendering unit 201 determines whether or not the information on all the areas on the scan line has been acquired. In the case where the results of the determination indicate that the information on all the areas has not been acquired yet, the processing returns to S1001 and in the case where the results of the determination indicate that the information on all the areas has been acquired, the processing proceeds to S1006. At S1006, the rendering unit 201 determines whether or not all the scan lines have been selected. In the case where the results of the determination indicate that all the scan lines have not been selected yet, the processing returns to S1000 and in the case where the results of the determination indicate that all the scan lines have been selected, the rendering unit 201 exits the processing.

(Raster Image Generation Processing—Combined Node Combining Processing)

Figure 11:
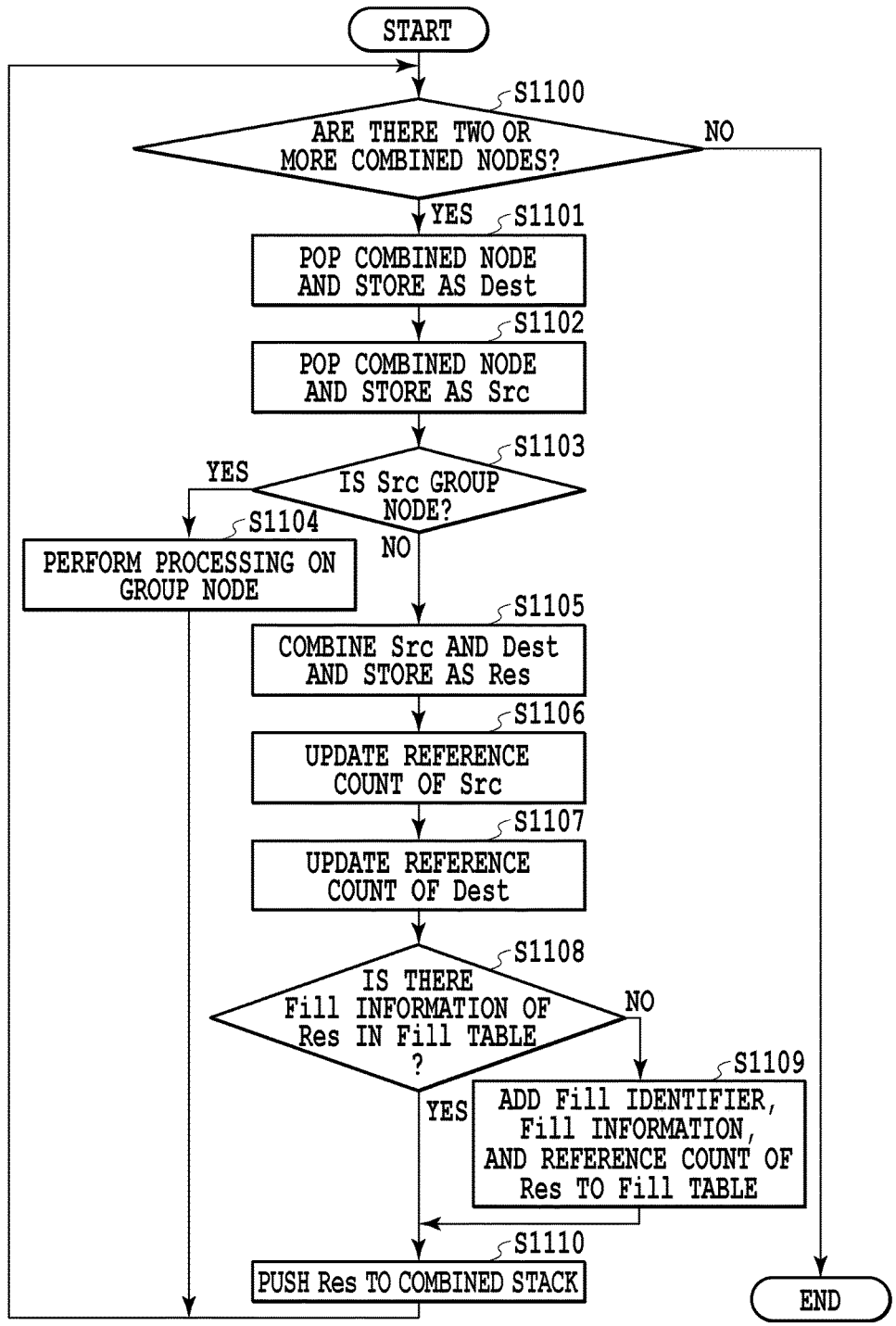
FIG. 11 is a flowchart of combined node combining processing that is performed by a combining unit 202 in the case where flattening is not performed in the first embodiment.

FIG. 11 is a flowchart of processing to combine a combined node included in a combined stack by using the combining unit 202 at S1003. It is assumed that the operation to push and the operation to pop in a stack are performed for the node that exists at the top of the stack. Further, it is assumed that the storing of data is performed by overwriting temporary data. First, at S1100, the combining unit 202 determines whether or not there are two or more combined nodes in the combined stack. In the case where the results of the determination indicate that there are two or more combined nodes in the combined stack, the processing proceeds to S1101 and in the case where the results of the determination indicate that there are not two or more combined nodes in the combined stack, the combining unit 202 exits the processing. At S1101, the combining unit 202 pops the combined node from the combined stack and stores the combined node as temporary data Dest. Next, the processing proceeds to S1102. At S1102, the combining unit 202 further pops the combined node from the combined stack and stores the combined node as temporary data Src. Next, the processing proceeds to S1103. At S1103, the combining unit 202 determines whether or not the temporary data Src is a group node (group node will be explained later in detail). In the case where the results of the determination indicate that Src is a group node, the processing proceeds to S1104 and in other cases, the processing proceeds to S1105. Here, explanation is given on the assumption that a group node does not exist (S1103→S1105). In the case where Src is not a group node, at S1105, the combining unit 202 calculates the combining results of Src and Dest in accordance with the combining operator 709 of Src and Dest and stores the calculation results as temporary data Res. Next, the processing proceeds to S1106. At S1106, the combining unit 202 updates the reference count 803 for the combined node that has been stored as Src. Next, the processing proceeds to S1107. At S1107, the combining unit 202 updates the reference count 803 for the combined node that has been stored as Dest. Next, the processing proceeds to S1108. At S1108, the combining unit 202 determines whether or not there is Fill information on the node that has been stored as Res in the Fill table 800. In the case where the results of the determination indicate that there is Fill information on the node that has been stored as Res in the Fill table 800, the processing proceeds to S1110 and in the case where there is not Fill information on the node that has been stored as Res in the Fill table 800, the processing proceeds to S1109. At S1109, the combining unit 202 adds the Fill identifier, the Fill information, and the reference count corresponding to the node that has been stored as Res to the Fill table 800. Next, the processing proceeds to S1110. At S1110, the combining unit 202 pushes the combined node that has been stored as Res to the combined stack. Next, the processing returns to S1100. At S1100, in the case where it is determined that there are not two or more combined nodes in the combined stack, i.e., in the case where only one combined node remains in the combined stack, the combining unit 202 exits the processing. At the time of exiting the processing, the combining unit 202 disposes of the temporary data that has been stored as Src, Dest, and Res.

(Raster Image Generation Processing—Combined Node Combining Processing—Reference Count Updating Processing)

Figure 12:
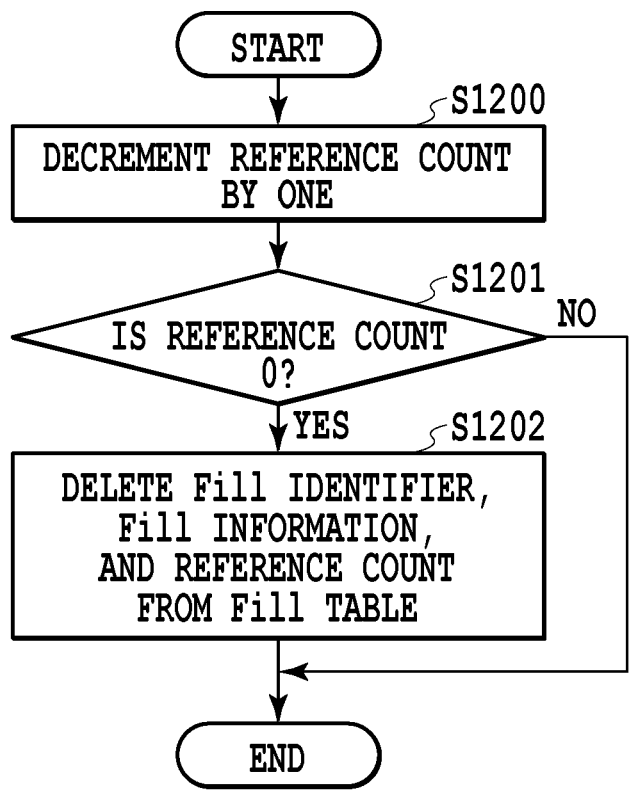
FIG. 12 a flowchart of updating processing of a reference count 803 in the first embodiment.

FIG. 12 is a flowchart of the updating processing of the reference count 803 at S1106 and S1107. First, at S1200, the combining unit 202 decrements the corresponding reference count 803 by one. Next, the processing proceeds to S1201. At S1201, the combining unit 202 determines whether or not the reference count has reached 0. In the case where the results of the determination indicate that the reference count has reached 0, the processing proceeds to S1202 and in the case where the reference count has not reached 0 yet, the combining unit 202 exits the processing. At S1202, the combining unit 202 deletes the items of the corresponding Fill identifier 801, the Fill information 802, and the reference count 803 from the Fill table 800 together with the entire row, and then exits the processing.

(Explanation of Group)

Hereinafter, a group is explained.

Figure 13:
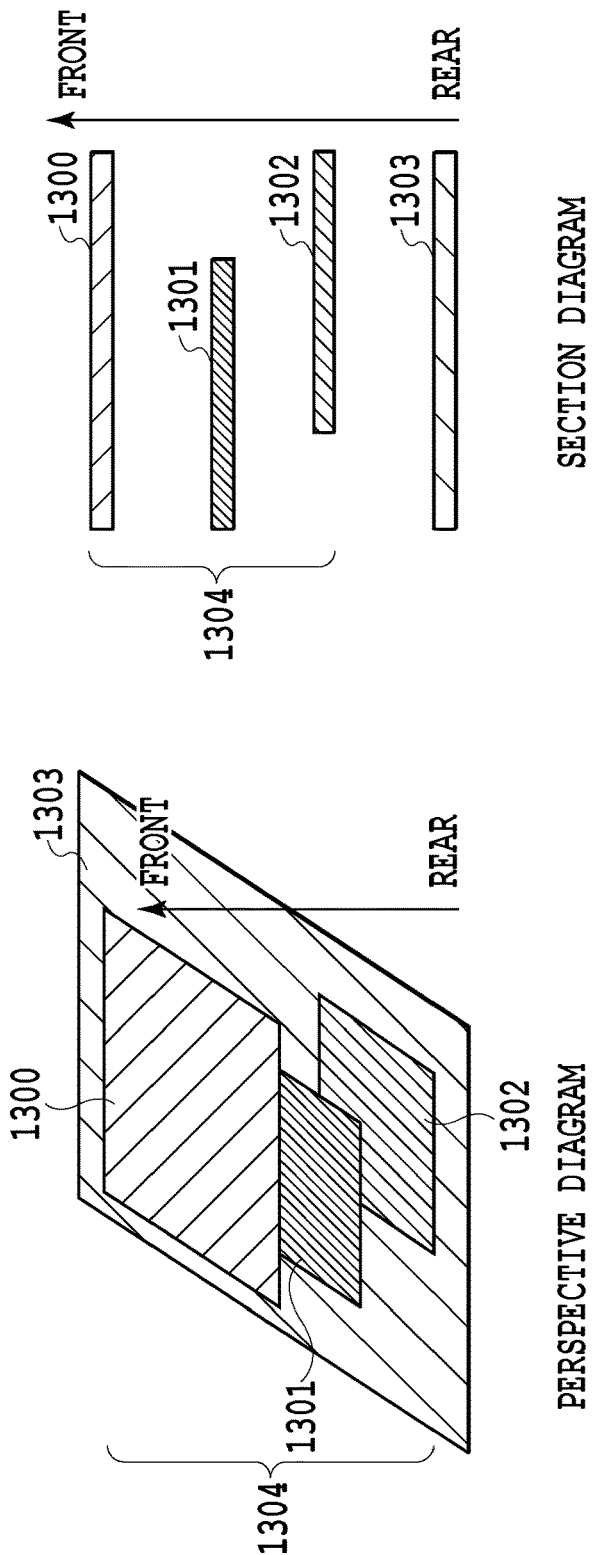
FIGS. 13A and 13B are diagrams showing an example of a group in the first embodiment.

FIG. 13A and FIG. 13B are diagrams showing an example of a group: FIG. 13A is a perspective diagram and FIG. 13B is a section diagram. In this example, three objects 1300 to 1302 on a BackGround 1303 are group elements constituting a group 1304.

Figure 14:
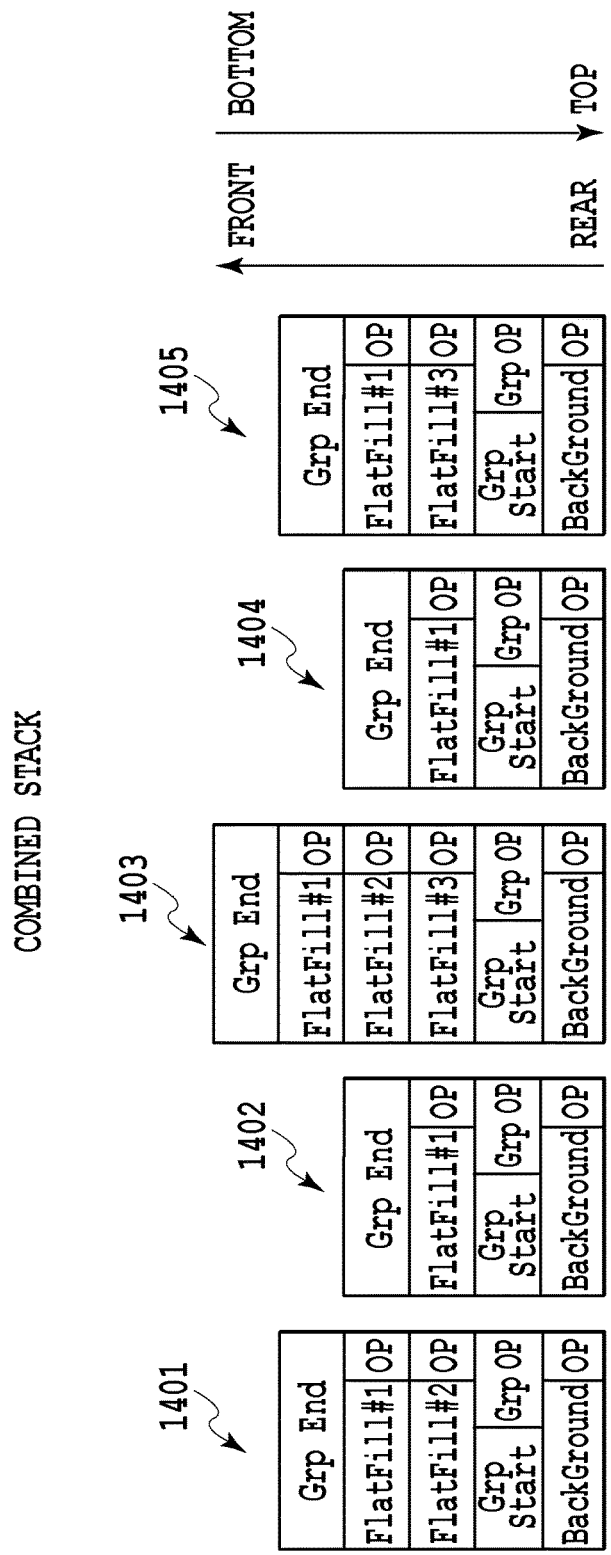
FIG. 14 is a diagram showing an example of intermediate data 205 (in particular, a combined stack) in the case where there is a group in the first embodiment.

FIG. 14 is a diagram showing a structure of a combined stack in the example in FIG. 13A and FIG. 13B. The group element is sandwiched by special combined nodes (in the present specification, called "group nodes"), such as a group start (Grp Start) and a group end (Grp End). In other words, the group node corresponds to information for handling a plurality of objects (group elements) as the same group. That is, the plurality of objects form the same group by a group operator. At this time, the group start is on the rear (top of the combined stack) side and the group end is on the front (bottom of the combined stack) side. The group start forms a set with a group operator Grp OP and the group operator specifies the combining method of a group. The combining method in the first embodiment supposes four (=2×2) methods in total, i.e., Isolated or Non-Isolated and Knockout or Non-Knockout. Each of the combining methods is specified by Transparency Groups of PDF in "Document management—Portable document format—Part 1: PDF 1.7" (Adobe System, ISO 32000-1, 2008.).

(Raster Image Generation Processing—Combined Node Combining Processing—Group Node Processing)

Figure 15:
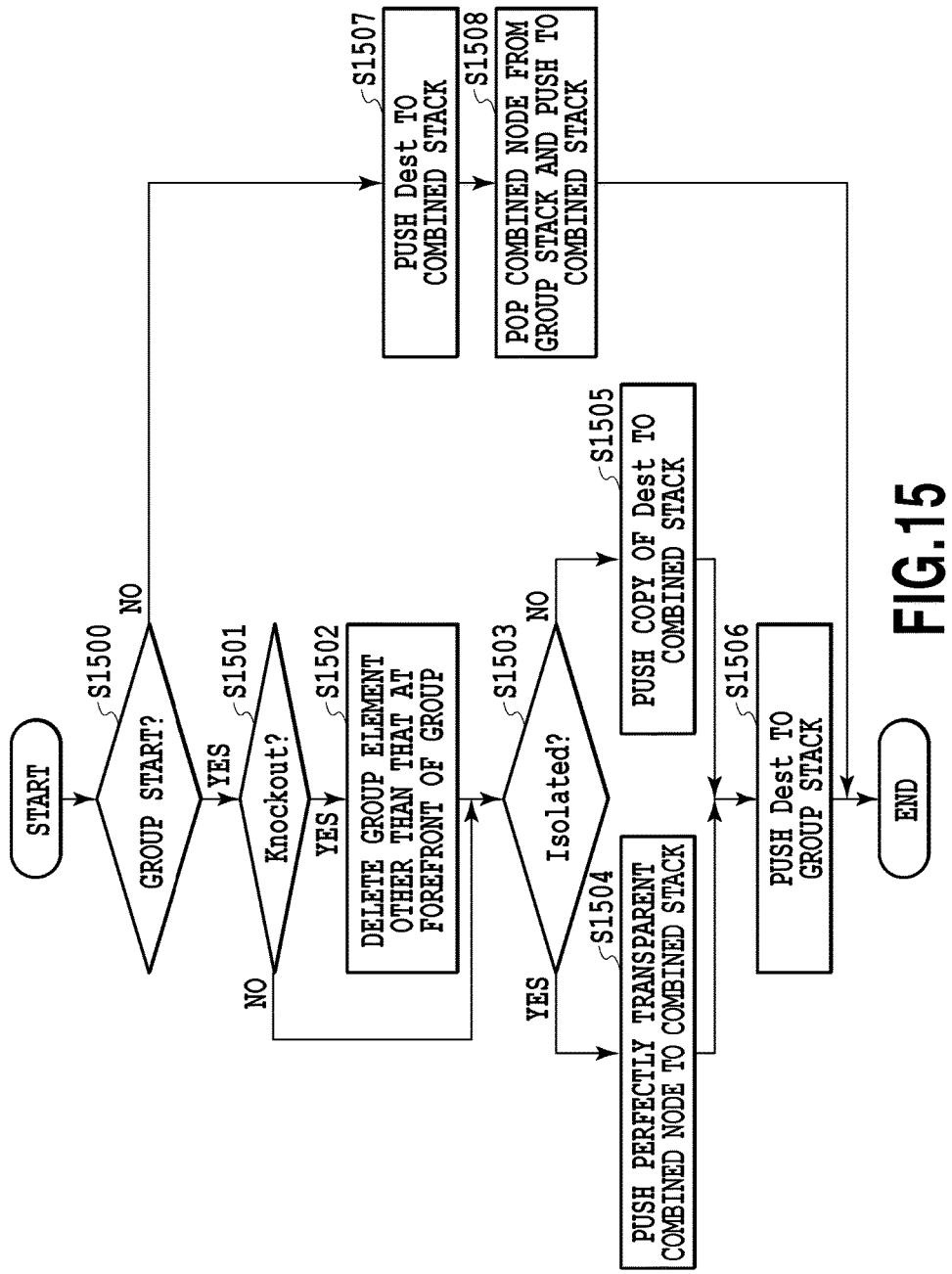
FIG. 15 is a flowchart of group processing in the case where flattening is not performed in the first embodiment.

In the case of determining that the Src is a group node at S1103 in FIG. 11, the combining unit 202 performs processing on the group node at S1104 and the processing returns to S1100. FIG. 15 is a detailed flowchart of S1104. First, at S1500, the combining unit 202 determines whether or not the group node is the group start. In the case where the results of the determination indicate that the group node is the group start, the processing proceeds to S1501 and in the case where the group node is not the group start (i.e., the group node is the group end), the processing proceeds to S1507. At S1501, the combining unit 202 determines whether or not the combining method is Knockout by referring to the group operator. In the case where the results of the determination indicate that the combining method is Knockout, the processing proceeds to S1502 and in the case where the combining method is not Knockout, the processing proceeds to S1503. At S1502, the combining unit 202 deletes the group element other than the group element at the forefront of the group. Next, the processing proceeds to S1503. At S1503, the combining unit 202 determines whether or not the combining method is Isolated by referring to the group operator. In the case where the results of the determination indicate that the combining method is Isolated, the processing proceeds to S1504 and in the case where the combining method is not Isolated, the processing proceeds to S1505. At S1504, the combining unit 202 creates a perfectly transparent combined node and pushes the combined node to the combined stack. Next, the processing proceeds to S1506. On the other hand, in the case where the results of the determination indicate that the combining method is not Isolated, the combining unit 202 creates a combined node that is a copy of the Dest at S1505 and pushes the combined node to the combined stack. Next, the processing proceeds to S1506. After pushing the combined node to the combined stack at S1504 or S1505, the combining unit 202 subsequently pushes the Dest to a temporary stack called a group stack at 1506 and exits the processing. The group stack is empty in the initial state. In the case of determining that the group node is not the group start (i.e., the group node is the group end) at S1500, the combining unit 202 pushes the Dest to the combined stack at S1507. Next, the processing proceeds to S1508. At S1508, the combining unit 202 pops the combined node from the group stack, pushes the popped combined node to the combined stack, and exits the processing.

Figure 16:
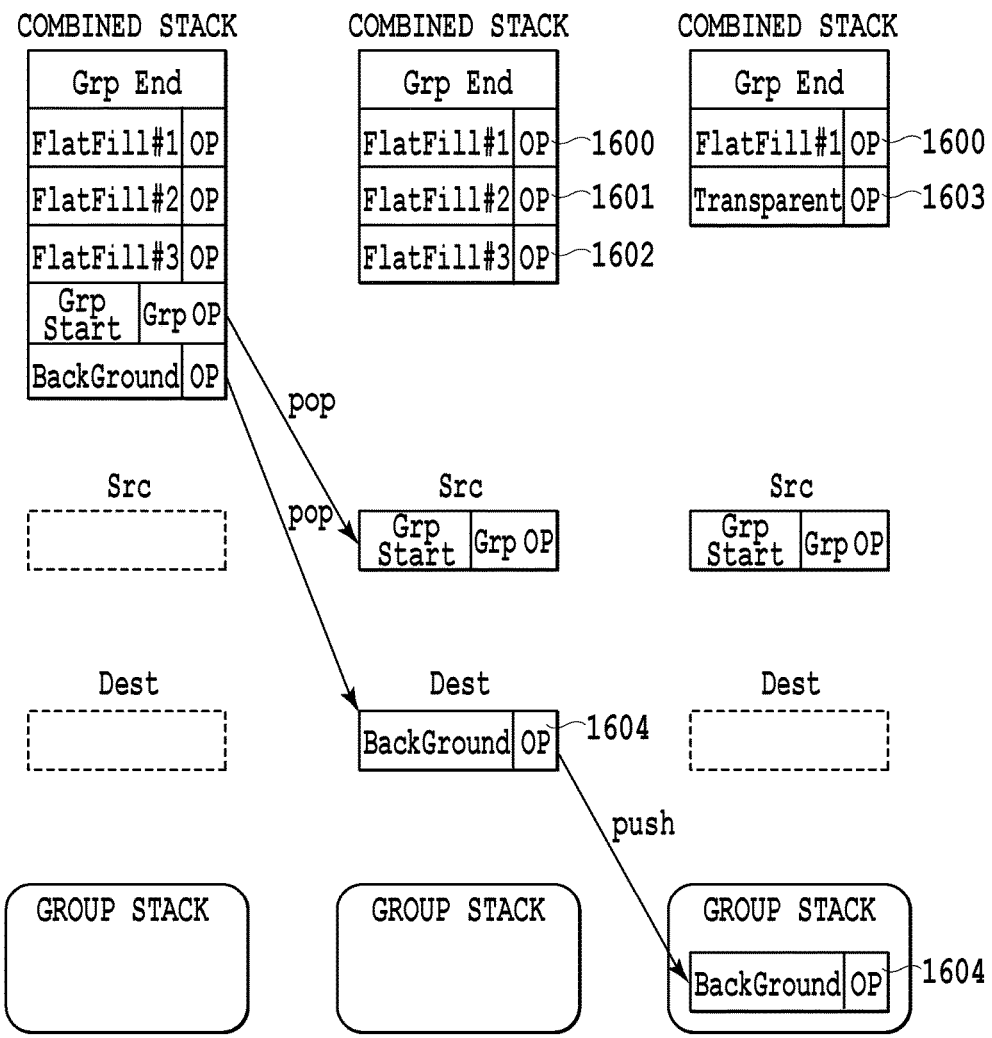
FIG. 16 is a diagram showing a state of a combined stack etc. in the case where a group node is a group start in the first embodiment.

FIG. 16 is a diagram showing the state of the combined stacks etc. in the case where the group node is the group start in the flowchart in FIG. 15. FIG. 16 shows the way the processing flows from left to right of FIG. 16. In the example in FIG. 16, the case where the combining method of the group is Knockout and Isolated is supposed. Because the combining method of the group is Knockout, a combined node 1601 and a combined node 1602, which are the group elements other than the group element at the forefront of the group, are deleted. Further, because the combining method of the group is Isolated, a combined node 1603, which is a perfectly transparent combined node, is pushed to the combined stack. Further, a combined node 1604 stored as the Dest is pushed to the group stack (S1500→S1501→S1502→S1503→S1504→S1506).

Figure 17:
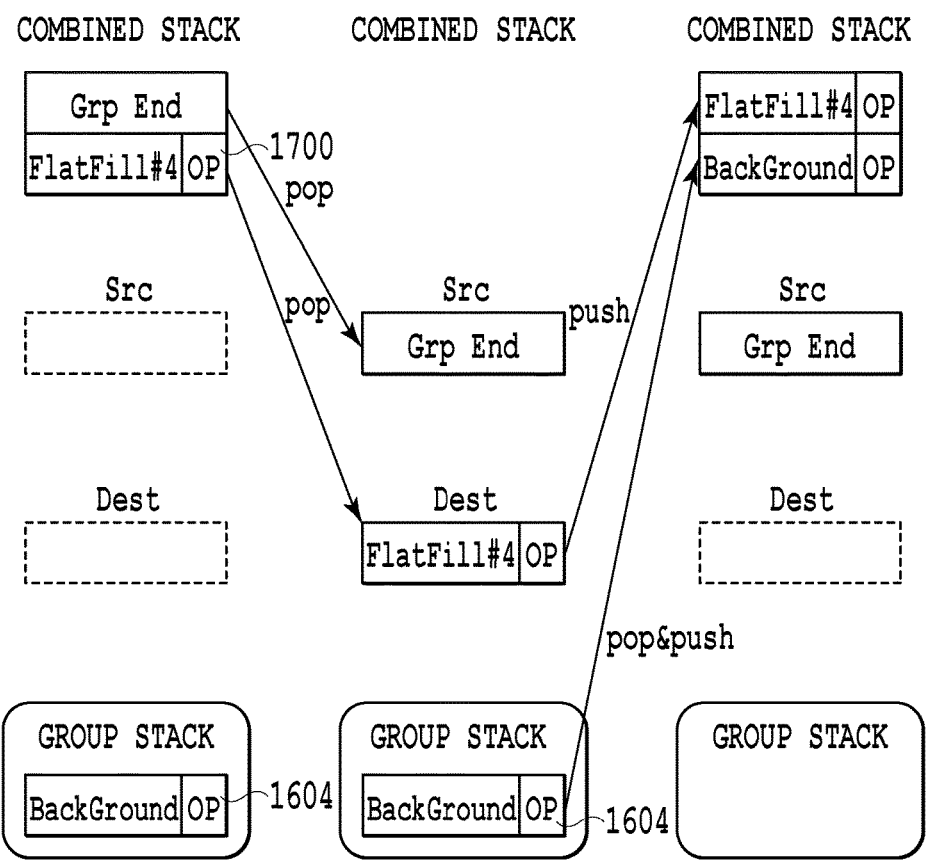
FIG. 17 is a diagram showing a state of a combined stack etc. in the case where the group node is a group end in the first embodiment.

FIG. 17 is a diagram showing the state of combined stacks etc. in the case where the group node is not the group start (i.e., the group node is the group end), following FIG. 16. FIG. 17 also shows the way the processing flows from left to right as in FIG. 16. A combined node 1600 and the combined node 1603 are combined in accordance with the flowchart shown in FIG. 11 and by referring to FIG. 17, it is known that a combined node 1700 that is the combining results is stacked on the combined stack. At the time of combining, the group start stored as the Src is deleted by being overwritten. After the combined node 1700 is popped to the Dest, the combined node 1700 is pushed again to the combined stack because the Src is the group end. Then, the combined node 1604 that has been stacked on the group stack is popped from the group stack and pushed to the combined stack (S1101→S1102→S1103→S1104, S1500→S1507→S1508).

The subsequent combining processing is as shown in FIG. 11. By the processing flow explained hitherto, the series of combining processing is implemented except for the case where flattening is performed.

(Flattening)

Hereinafter, flattening is explained.

As explained above (in the chapter of "Processing in the intermediate data generation unit 200), in the case of determining that the data size of the intermediate data 205 is equal to or greater than the threshold value at S300 in FIG. 3, the intermediate data generation unit 200 performs flattening by using the combining unit 202. Flattening is processing to combine the combined node that is the intermediate data 205 at the point of time of the determination at S300, and a reduction in the data size is implemented by deleting the items of the Fill information 802 etc., which is no longer referred to in the first embodiment, from the Fill table 800 together with the entire row.

Figure 18A:
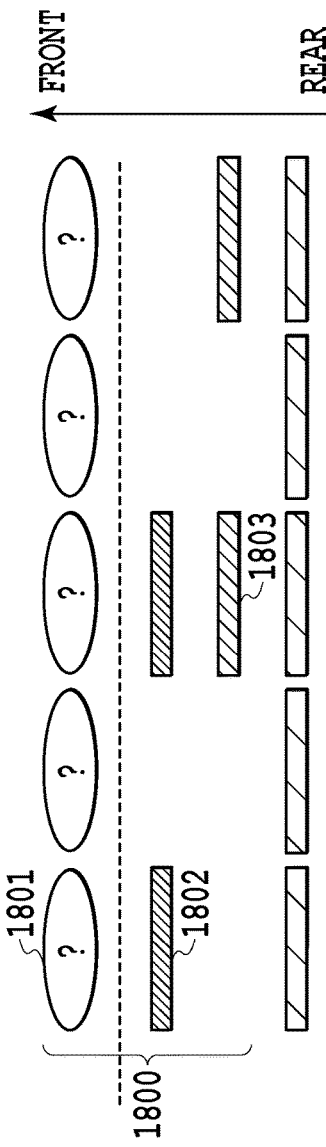
FIGS. 18A and 18B are diagrams showing an example of the intermediate data 205 (in particular, a combined stack) in the case where flattening is performed on the way of the processing performed on the group in the first embodiment.
Figure 18B:
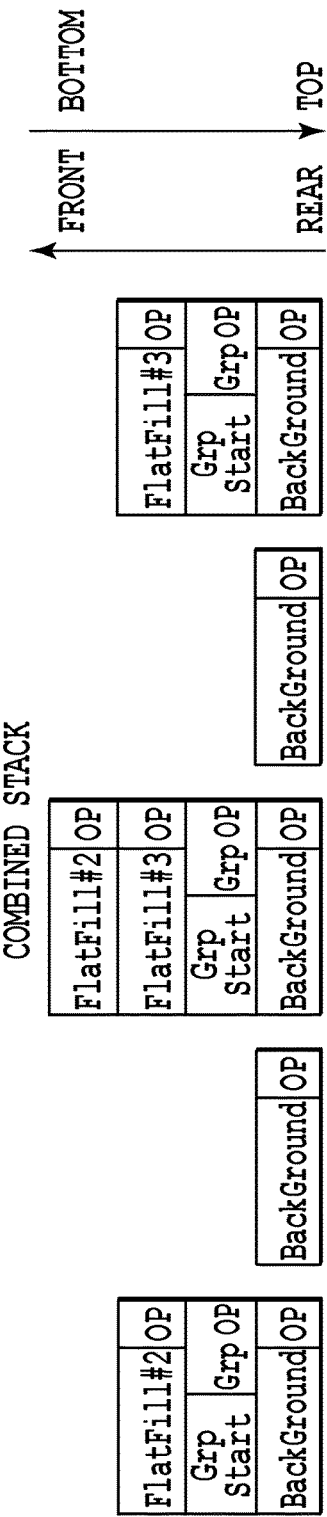

There is a possibility that flattening will be performed even in the case where intermediate data 205 is generated only for part of the group. FIGS. 18A and 18B are diagrams showing an example of the intermediate data 205 (in particular, the combined stack) in the case where flattening is performed in the state where the intermediate data 205 is generated only for part of the group. In the example in FIG. 18A, as group elements of a group 1800, there are three objects 1801 to 1803. Here, in the case where flattening is performed immediately after the intermediate data 205 is generated for up to the object 1802, at the point of time immediately after the generation, which kind of object the object 1801 is and how the object 1801 overlaps are unknown. FIG. 18B is a diagram showing the combined stack of the intermediate data 205 at this point of time. A method of performing combining so that a color that is intended is output ultimately even in the situation where flattening is performed in the state where the intermediate data 205 is generated only for part of the group is explained below.

Figure 19:
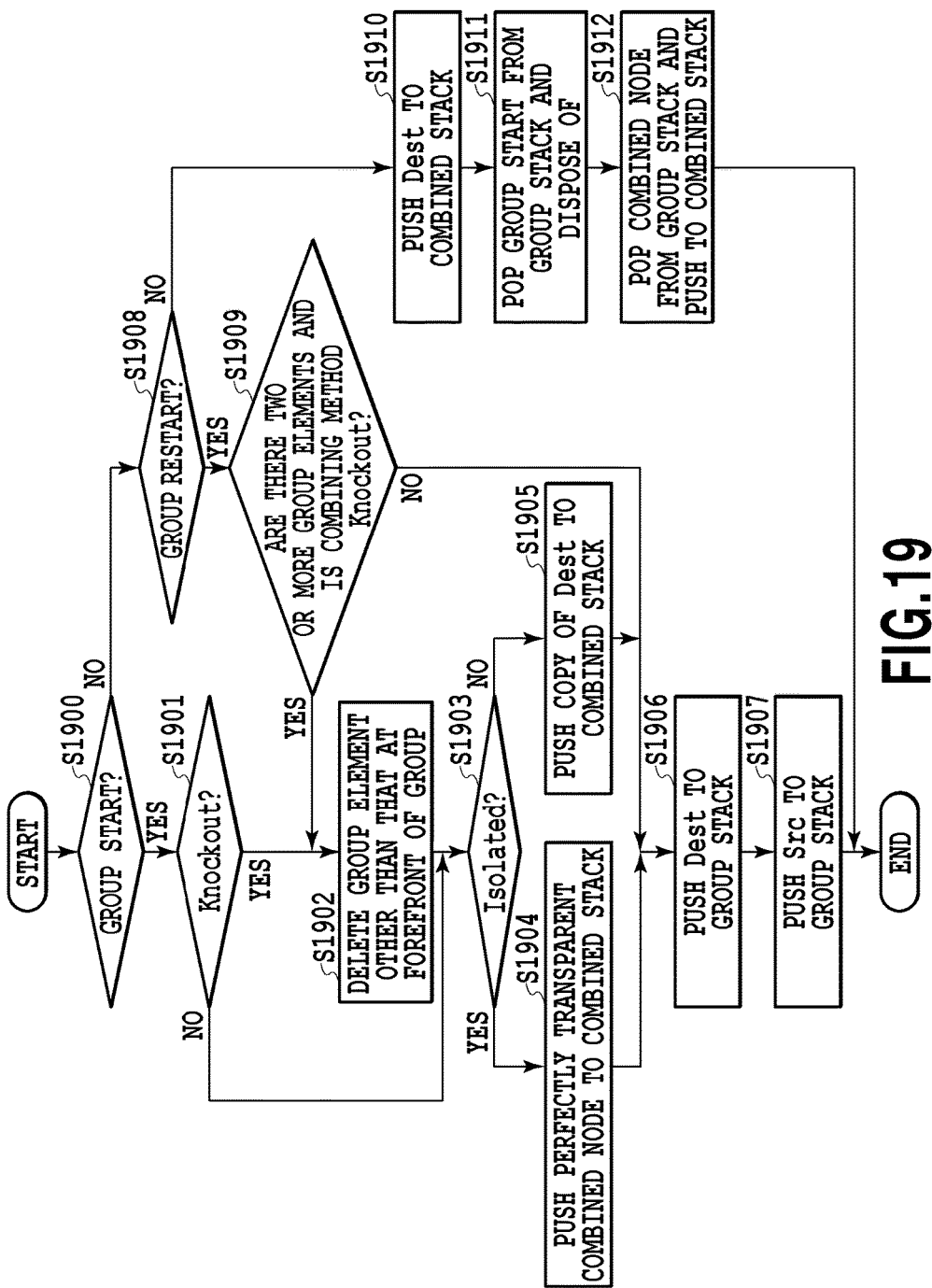
FIG. 19 is a flowchart of group processing in the case where flattening is performed in the first embodiment.

FIG. 19 is a flowchart of group processing in the case where flattening is performed. This flowchart shows a flow of processing that is performed at S2004 in FIG. 20. A method of group processing is determined in accordance with the flow shown in FIG. 19. S1900 to S1906 are the same as those in the case where flattening is not performed (FIG. 15). However, the flow in FIG. 19 differs from the flow in FIG. 15 in that the Src (i.e., the group start) is also pushed to the group stack at 1907.

Figure 20:
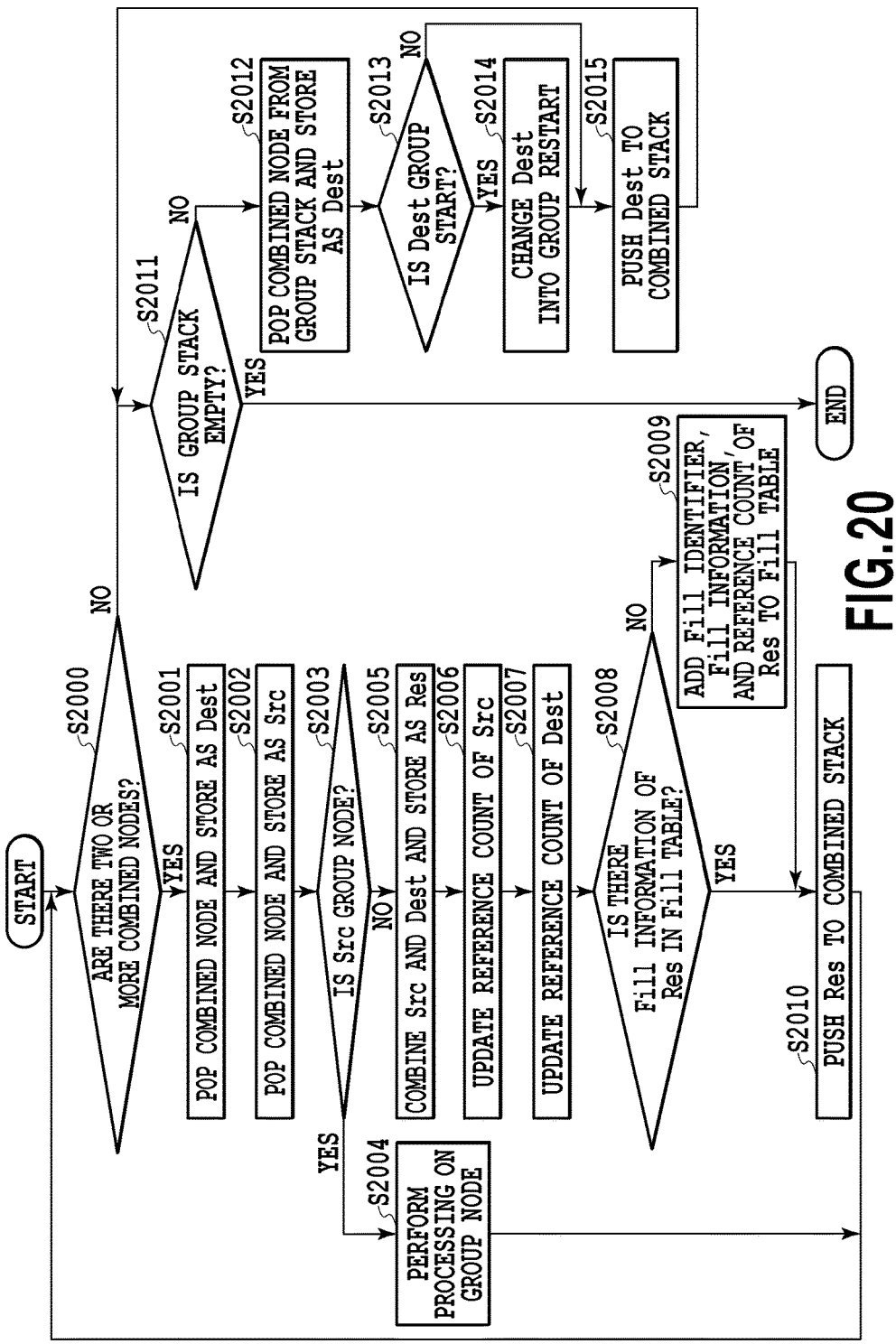
FIG. 20 is a flowchart of combined node combining processing that is performed by the combining unit 202 in the case where flattening is performed in the first embodiment.

Here, FIG. 20 shows a flowchart of combined node combining processing that is performed by the combining unit 202 in the case where flattening is performed. The processing at S2000 to S2010 are the same as that at S1101 to S1110 in the case where flattening is not performed (FIG. 11). However, at S2004, the processing in the flowchart shown in FIG. 19 is performed in place of that at S1004. Further, the flowchart in FIG. 20 differs from that in FIG. 11 in that whether or not the group stack is empty is determined at S2011 in the case where the combining unit 202 determines that there are not two or more combined nodes at S2000. In the case where the results of the determination at S2011 indicate that the group stack is empty, the combining unit 202 exits the processing and in the case where the group stack is not empty, the processing proceeds to S2012. The case where the group stack is not empty means that flattening is performed in the state where the intermediate data 205 is generated only for part of the group. At this time, at S2012, the combining unit 202 pops the combined node from the group stack and stores the combined node as the Dest. Next, the processing proceeds to S2013. At S2013, the combining unit 202 determines whether or not the Dest is the group start. In the case where the results of the determination indicate that the Dest is the group start, the processing proceeds to S214 and in the case where the Dest is not the group start, the processing proceeds to S2015. At S2014, the combining unit 202 changes the Dest into a special combined node called a group restart. The group restart is also one of the group nodes. The group restart also forms a set with a group operator, and as the group operator with which the set is formed, the same group operator as that in the case of the group start is set. Next, the processing proceeds to S2015. At S2015, the combining unit 202 pushes the Dest to the combined stack. Next, the processing returns to S2011.

Explanation is returned to FIG. 19. In the case of determining that the group node is not the group start at S1900, the processing proceeds to S1908. At S1908, the combining unit 202 determines whether or not the group node is the group restart. In the case where the results of the determination indicate that the group node is the group restart, the processing proceeds to S1909. At S1909, the combining unit 202 determines whether or not there are two or more group elements and the combining method is Knockout. In the case where the results of the determination indicate that there are two or more group elements and that the combining method is Knockout, the processing proceeds to S1902. In other cases, the processing proceeds to S1906. By branching of processing at S1908 and S1909, the combined node (perfectly transparent combined node or copy of Dest) that is classified according to Isolated or Non-Isolated is pushed to the combined stack only in the case where doing so is necessary. In the case of determining that the group node is not the group restart (i.e., the group node is the group end) at S1908, the processing proceeds to S1910. Here, the processing at S1910 and S1912 is the same as that in the case where flattening is not performed (S1507 and S1508 in FIG. 15). However, the processing differs from that in FIG. 15 in that the group start stacked on the top of the group stack is popped and disposed of at S1911.

Figure 21:
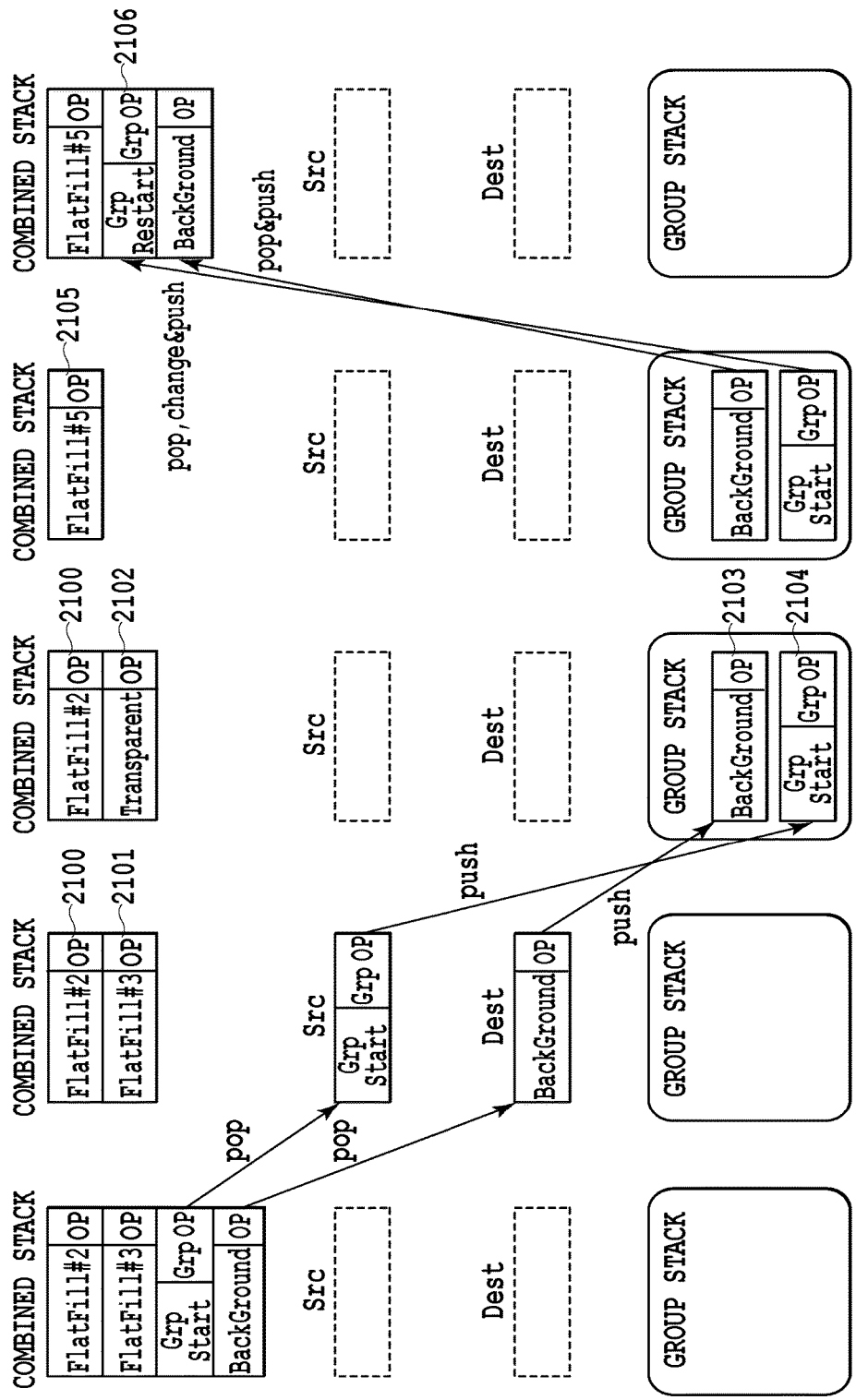
FIG. 21 is a diagram showing a state of a combined stack etc. while flattening is being performed in the first embodiment.

FIG. 21 is a diagram showing the state of the combined stacks etc. in the case where flattening is performed in the flowchart in FIG. 19 and FIG. 20. This example supposes the case where the combining method of the group is Knockout and Isolated. Because the combining method of the group is Knockout, a combined node 2101 that is the group element other than that at the forefront of the group is deleted (S1901→S1902). Further, because the combining method of the group is Isolated, a combined node 2102 that is a perfectly transparent combined node is pushed to the combined stack (S1903→S1904). Furthermore, a combined node 2103 that has been stored as the Dest and a group start 2104 that has been stored as the Src are pushed to the group stack (S1906→S1907). After that, a combined node 2100 and the combined node 2102 are combined and a combined node 2105 that is the combining results is pushed to the combined stack (S2000→→S2010). Due to this, only one combined node remains in the combined stack, and therefore, all the elements within the group stack are pushed to the combined stack. In other words, part (group nodes 2100, 2101) of the objects forming the group are not combined with the background object (node 2103 within the group stack) and are flattened on the way of the processing performed on the group. In the present embodiment, a plurality of objects (group nodes 2100, 2101) is the targets of flattening, but the number of target objects of flattening may be at least one. Further, at this time, the group start 2104 is changed into a group restart 2106 (S2000→S2011→S2012→S2013→S2014→S2015). Because of this, as will be describe later, the results of flattening part of objects of the group are combined with the remaining object (group node 2201) of the group, and therefore, all the objects forming the group are combined correctly, and the results thereof are combined with the background object.

Figure 22:
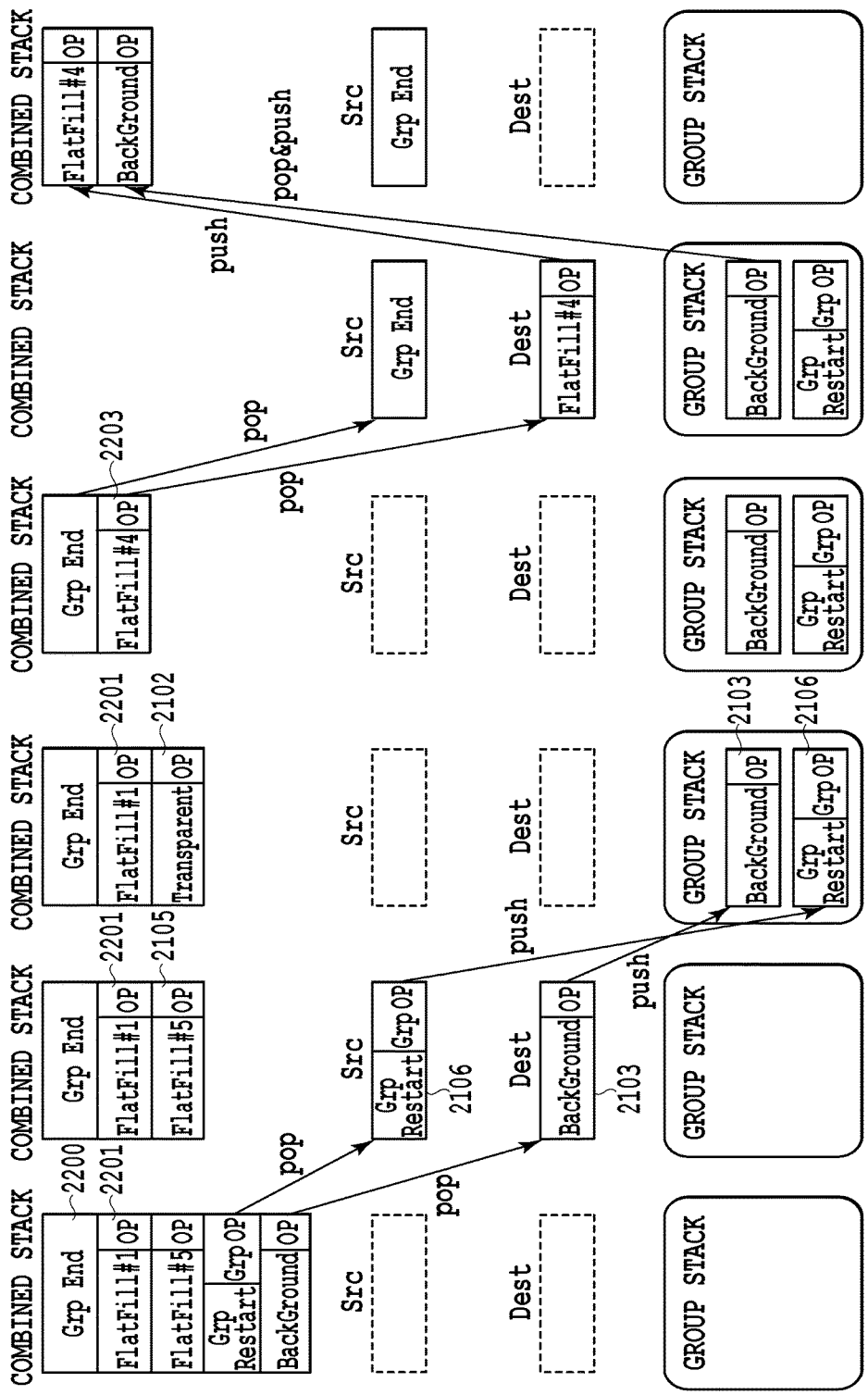
FIG. 22 is a diagram showing a state of a combined stack etc. after flattening is performed in the first embodiment.

FIG. 22 is a diagram that follows FIG. 21 and which shows the state of the combined stacks etc. in the case where the generation of the intermediate data 205 has been completed and the combining processing is performed in the rendering unit 201. Because the generation of the intermediate data 205 has been completed, on the combined stack, a group end 2200 and a combined node 2201 are stacked. Because there are two or more group elements and the combining method of the group is Knockout, the combined node 2105 that is a group element other than that at the forefront of the group is deleted (S1908→S1909→S1902). Further, because the combining method of the group is Isolated, the combined node 2102 that is a perfectly transparent combined node is pushed again to the combined stack (S1903→S1904). Then, the combined node 2103 that has been stored as the Dest and the group restart 2106 that has been stored as the Src are pushed to the group stack (S1906→S1907). After that, the combined node 2201 and the combined node 2102 are combined and a combined node 2203 that is the results of combining is pushed to the combined stack (S2000→ . . . →S2010). In the case where the group end 2200 is reached, the combined node 2203 that has been stored as the Dest and the combined node 2103 within the group stack are pushed to the combined stack (S1910, S1912). At this time, the group restart 2106 within the group stack is popped from the group stack and disposed of (S1911).

As explained above, by switching the combining processing procedures in accordance with whether or not flattening is performed and the combining method of the group, it is possible to perform combining so that a color intended is output ultimately even in the case where flattening is performed on the way of the processing performed on the group.

Second Embodiment

It may also be possible to specify a color space in which combining processing is performed by a group operator in the case where the combining method of the group is Isolated.

In the flowcharts explained in FIG. 19 and FIG. 20, it is possible to perform combining so that a color that is intended is output even in the case where flattening is not performed, and therefore, it may also be possible to use the combining processing in these flowcharts in common to the case where flattening is not performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-079721, filed Apr. 8, 2014, which is hereby incorporated by reference wherein in its entirety.

What is claimed is:

1. A rendering apparatus comprising:
at least one processor and a memory, wherein the at least one processor executes a program loaded in the memory to function as:
a reception unit configured to receive print data including a plurality of objects that form a group; and
a generation unit configured to generate intermediate data based on the received print data, wherein the generation unit:
performs a flattening process in which a plurality of pieces of intermediate data generated by the generation unit are combined to obtain new intermediate data, wherein a size of the obtained new intermediate data is lower than a size of the intermediate data already generated by the generation unit based on the received print data, and
wherein, the generation unit performs the flattening process for a part of the plurality of objects that form the group according to a combining method associated with the group, and after the flattening process for the part of the plurality of objects is performed, the generation unit generates intermediate data of the rest of the plurality of objects.

2. The rendering apparatus according to claim 1, wherein the generation unit combines the generated intermediate data of the part of the plurality of objects by flattening intermediate data of a part of the group including one object and by flattening intermediate data of a background of the part of the group.

3. The rendering apparatus according to claim 1, wherein, after the generation of the intermediate data of the rest of the plurality of objects, the generation unit combines the new intermediate data and the intermediate data of the rest of the plurality of objects according to the associated combining method.

4. The rendering apparatus according to claim 3, wherein, in the combining of the new intermediate data and the intermediate data of the rest of the plurality of objects, the generation unit combines a part of the new intermediate data corresponding to one object and the intermediate data of the rest of the plurality of objects, and combines the rest of the new intermediate data and a result of the combining.

5. A rendering method executed by a processor of a rendering apparatus, the method comprising:
receiving print data including a plurality of objects, wherein at least two objects of the plurality of objects form a group;
generating intermediate data of a part of the plurality of objects, the part including one object of the at least two objects and not including another object of the at least two objects;
combining the generated intermediate data according to a combining method associated with the group to obtain new intermediate data, wherein a size of the obtained new intermediate data is lower than a size of the intermediate data already generated by the generation unit based on the received print data,
wherein, after the combining, generating intermediate data of the rest of the plurality of objects, the rest including the another object and the intermediate data of the another object being associated with the combining method,
wherein the combining method is associated with the group by a group operator, and
wherein the combing method specifies whether an object in a group overlapped with another object in the group is neglected or not neglected in a region where the objects overlap and specifies whether objects in the group are combined with the background or without the background.

6. The rendering method according to claim 5, wherein, in the combining, the generated intermediate data of the part of the plurality of objects is combined by flattening intermediate data of a part of the group including the one object and by flattening intermediate data of a background of the part of the group.

7. The rendering method according to claim 5, further comprising, after the generation of the intermediate data of the rest, combining the new intermediate data and the intermediate data of the rest of the plurality of objects according to the associated combining method.

8. The rendering method according to claim 7, wherein, in the combining of the new intermediate data and the intermediate data of the rest, a part of the new intermediate data corresponding to the one object and the intermediate data of the rest are combined, and then the rest of the new intermediate data and the result of the combining are combined.

9. A rendering method executed by a processor of a rendering apparatus, the method comprising:
receiving print data including a plurality of objects and a group of objects that form a group; and
generating intermediate data based on the received print data;
performing a flattening process for a part of the plurality of objects that form the group according to a combining method associated with the group,
wherein in the flattening process, a plurality of pieces of the generated intermediate data are combined to obtain first intermediate data of the combined result and a size of the obtained first intermediate data is lower than a size of the intermediate data already generated based on the received print data;
generating second intermediate data of a rest of the plurality of objects that form the group, wherein the second intermediate data is generated in accordance with the combining method associated with the group; and
performing a rendering process based on the first intermediate data and the second intermediate data according to the combining method associated with the group.

10. The rendering method according to claim 9, wherein the first intermediate data is kept stored after the performing of the flattening process for the part of the plurality of objects.

11. The rendering method according to claim 9, wherein the combining method is associated with the group by a group operator.

12. The rendering method according to claim 9, wherein the intermediate data is represented by one or more regions, each region being associated with a stack containing one or more pieces of information related to one or more objects contributing to the region.

13. The rendering method according to claim 9, wherein the first intermediate data is a raster image.

14. The rendering apparatus according to claim 1, wherein the generation unit performs the flattening process, in a case where a total size of intermediate data already generated based on the received print data exceeds a threshold value.

* * * * *